(12) United States Patent
Ozaki et al.

(10) Patent No.: US 9,776,291 B2
(45) Date of Patent: Oct. 3, 2017

(54) METHOD FOR MANUFACTURING VALVE BODY FOR SPOOL VALVE

(71) Applicant: DENSO CORPORATION, Kariya, Aichi-pref. (JP)

(72) Inventors: Akira Ozaki, Chiryu (JP); Shuichi Nagase, Inabe (JP)

(73) Assignee: DENSO CORPORATION, Kariya (JP)

( * ) Notice: Subject to any disclaimer, the term of this patent is extended or adjusted under 35 U.S.C. 154(b) by 306 days.

(21) Appl. No.: 14/542,749

(22) Filed: Nov. 17, 2014

(65) Prior Publication Data

US 2015/0209916 A1    Jul. 30, 2015

(30) Foreign Application Priority Data

Jan. 24, 2014  (JP) ................................. 2014-011446

(51) Int. Cl.
| | |
|---|---|
| *B23P 15/00* | (2006.01) |
| *F16K 11/07* | (2006.01) |
| *B22D 25/02* | (2006.01) |
| *F16K 27/04* | (2006.01) |
| *B22D 17/22* | (2006.01) |

(52) U.S. Cl.
CPC ............ *B23P 15/001* (2013.01); *B22D 25/02* (2013.01); *F16K 11/07* (2013.01); *F16K 27/041* (2013.01); *B22D 17/22* (2013.01); *Y10T 29/49426* (2015.01)

(58) Field of Classification Search
CPC ...... B23P 15/001; F16K 27/041; F16K 11/07; B22D 25/02; B22D 17/22; Y10T 29/49426
See application file for complete search history.

(56) References Cited

U.S. PATENT DOCUMENTS

| | | | |
|---|---|---|---|
| 3,052,013 A | * | 9/1962 | Kane ..................... F16K 27/041 |
| | | | 219/69.17 |
| 4,570,585 A | * | 2/1986 | Hayashi ................... F01L 3/22 |
| | | | 123/188.8 |
| 5,014,741 A | * | 5/1991 | Taguchi .............. F16H 57/0424 |
| | | | 184/6.12 |

FOREIGN PATENT DOCUMENTS

| | | | | |
|---|---|---|---|---|
| JP | S57-167571 A | | 10/1982 | |
| JP | H11-044361 A | | 2/1999 | |
| JP | 11148575 A | * | 6/1999 | ............ F16K 31/06 |
| JP | H11-148575 A | | 6/1999 | |
| JP | WO 2013160995 A1 | * | 10/2013 | ............... B32B 1/00 |

(Continued)

OTHER PUBLICATIONS

English Machine Translation of JPH11148575A, Takanashi Koichi, Jun. 2, 1999.*

(Continued)

*Primary Examiner* — Sarang Afzali

(57) ABSTRACT

An axial cast hole is formed to have a large diameter side end on one side at a draft angle. A large diameter hole is formed on the one side to form a stepped surface between the large diameter hole and the axial cast hole. The stepped surface has an inner periphery end located on a plane perpendicular to the axial direction. A tool is moved from the one side toward the other side coaxially with the axial cast hole to make contact with the stepped surface. The tool is moved subsequently to cut the inner periphery of the axial cast hole between the large diameter hole and the first port. The tool is moved subsequently to cut the inner periphery of the axial cast hole on the other side relative to the first port.

6 Claims, 9 Drawing Sheets

AXIAL DIRECTION
ONE END ◄─────► OTHER END

(56) References Cited

FOREIGN PATENT DOCUMENTS

WO 2013-160995 A1 10/2013

OTHER PUBLICATIONS

Office Action dated Feb. 2, 2016 in corresponding JP Application No. 2014-011446.

* cited by examiner

AXIAL DIRECTION
ONE END ←——→ OTHER END

AXIAL DIRECTION
ONE END ⟵⟶ OTHER END

AXIAL DIRECTION
ONE END ⟵⟶ OTHER END

AXIAL DIRECTION
ONE END ←——→ OTHER END

AXIAL DIRECTION
ONE END ⟵⟶ OTHER END

AXIAL DIRECTION
ONE END ←——→ OTHER END

AXIAL DIRECTION
ONE END ⟵⟶ OTHER END

AXIAL DIRECTION
ONE END ⟵⟶ OTHER END

AXIAL DIRECTION
ONE END ⟵⟶ OTHER END

METHOD FOR MANUFACTURING VALVE BODY FOR SPOOL VALVE

CROSS REFERENCE TO RELATED APPLICATION

This application is based on reference Japanese Patent Application No. 2014-11446 filed on Jan. 24, 2014, the disclosure of which is incorporated herein by reference.

TECHNICAL FIELD

The present disclosure relates to a method for manufacturing a valve body for a spool valve.

BACKGROUND

For example, Patent Document 1 discloses a spool valve, which causes a spool to slide inside a valve body thereby to control opening and closing of multiple ports, which communicates between the inside of the valve body and the outside of the valve body. In this way, the spool valve is configured to open and close fluid passages to switch over the fluid passages, to control pressure in the fluid passages, and/or to meter a flow quantity of fluid passing through the fluid passages.

In a conventional spool valve, multiple ports include, for example, a first port, which is on the most one end side in the axial direction. That is, the first port is located on the side closest to the one end in the axial direction. A spool mainly slides on the other-end side of the first port. Therefore, a spool hole is formed on the other end side of the first port in the axial direction to have a predetermined diameter. Thus, the spool hole is finished to have a finished diameter.

For example, a manufacturing method for a valve body is conceivable to have a cast hole formation process and a finishing process. The finishing process is to finish a spool hole. Specifically, a cast hole formation process is first implemented to remove a casting core thereby to form a pilot hole for a spool hole on the other end side of the first port in the axial direction. The pilot hole is formed to have a diameter smaller than a finished diameter of the spool hole. In addition, cast holes are formed as ports to intersect substantially perpendicularly to an axial direction of the pilot hole. In the present state, a hole is formed on the one end side of the first port in the axial direction, and the diameter of the hole is greater than the finished diameter.

Subsequently, the finishing process is implemented to cause a cutting tool, such as a drill and a reamer, to cut the inner circumferential periphery of the pilot hole thereby to finish the spool hole to have the predetermined diameter.

It is noted that, the port is at a draft angle. Therefore, in the manufacturing method, it may be concerned that the cutting tool may deflect while the cutting tool is moved in the axial direction. Specifically, as shown in FIG. 9, in the finishing process, a cutting tool 102 is advanced toward a pilot hole 101. A first port 103 is at the draft angle. Therefore, the cutting tool 102 may make contact with the inner circumferential periphery of the first port only on a small diameter side of the first port 103. That is, the cutting tool 102 may cause partial contact with the inner circumferential periphery of the first port on the upper side in the drawing. Consequently, deflection of the cutting tool 102 may make precise manufacturing difficult.

It may be conceivable to implement an additional process before the finishing process of the spool hole to remove a portion of the first port at the draft angle. Nevertheless, the additional process may increase a manufacturing cost for the device.

Patent Document 1

Publication of unexamined Japanese patent application No. H11-44361

SUMMARY

It is an object of the present disclosure to produce a manufacturing method for a valve body for a spool valve to enable manufacturing of a spool hole with a high accuracy.

According to an aspect of the present disclosure, a method for manufacturing a valve body for a spool valve. The spool valve includes the valve body having an axial hole and a plurality of ports. The ports substantially perpendicularly intersect with the axial hole and communicate the axial hole with an outside of the valve body. The ports are arranged in an axial direction. The spool valve further includes a spool slidable inside the axial hole in the axial direction. The ports include a first port on one end side most in the axial direction. The axial hole has an axial hole portion on an other end side in the axial direction relative to the first port. The axial hole portion is formed as a spool hole, in which the spool is slidable. The spool hole has a predetermined diameter X. The method comprises forming, in a cast hole formation process, an axial cast hole to have a large diameter side end on the one end side in the axial direction relative to the first port, the large diameter side end being at a draft angle and having a diameter smaller than the predetermined diameter X, and a plurality of cast holes as the ports to intersect substantially perpendicularly to the axial cast hole. The method further comprises forming, in a large diameter hole formation process, a large diameter hole on the one end side in the axial direction relative to the axial cast hole to form a stepped surface, which is in an annular shape, between the large diameter hole and the axial cast hole. The large diameter hole is coaxial with the axial cast hole and has a diameter greater than the predetermined diameter X. The method further comprises moving, in a finishing process, a cutting tool from the one end side in the axial direction relative to the large diameter hole toward the other end side in the axial direction coaxially with the axial cast hole to cut an inner circumferential periphery of the axial cast hole to form the spool hole having the predetermined diameter X. The stepped surface has an inner circumferential periphery end located on a plane perpendicular to the axial direction. The finishing process further includes moving the cutting tool to make contact with the stepped surface, and subsequently to cut the inner circumferential periphery of the axial cast hole between the large diameter hole and the first port, and subsequently to cut the inner circumferential periphery of the axial cast hole on the other end side in the axial direction relative to the first port.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described in detail.

First Embodiment

Configuration of First Embodiment

The configuration of the first embodiment will be described with reference to FIGS. 1 to 7. The embodiment exemplifies application of the present disclosure to manufacturing of a spool valve 1 employed in a hydraulic pressure control device of a vehicular automatic transmission device.

The spool valve 1 includes a valve body 2 and a spool 3. The spool 3 is slidable inside the valve body 2. The spool valve 1 may employ a generally-known configuration.

Figure 1:
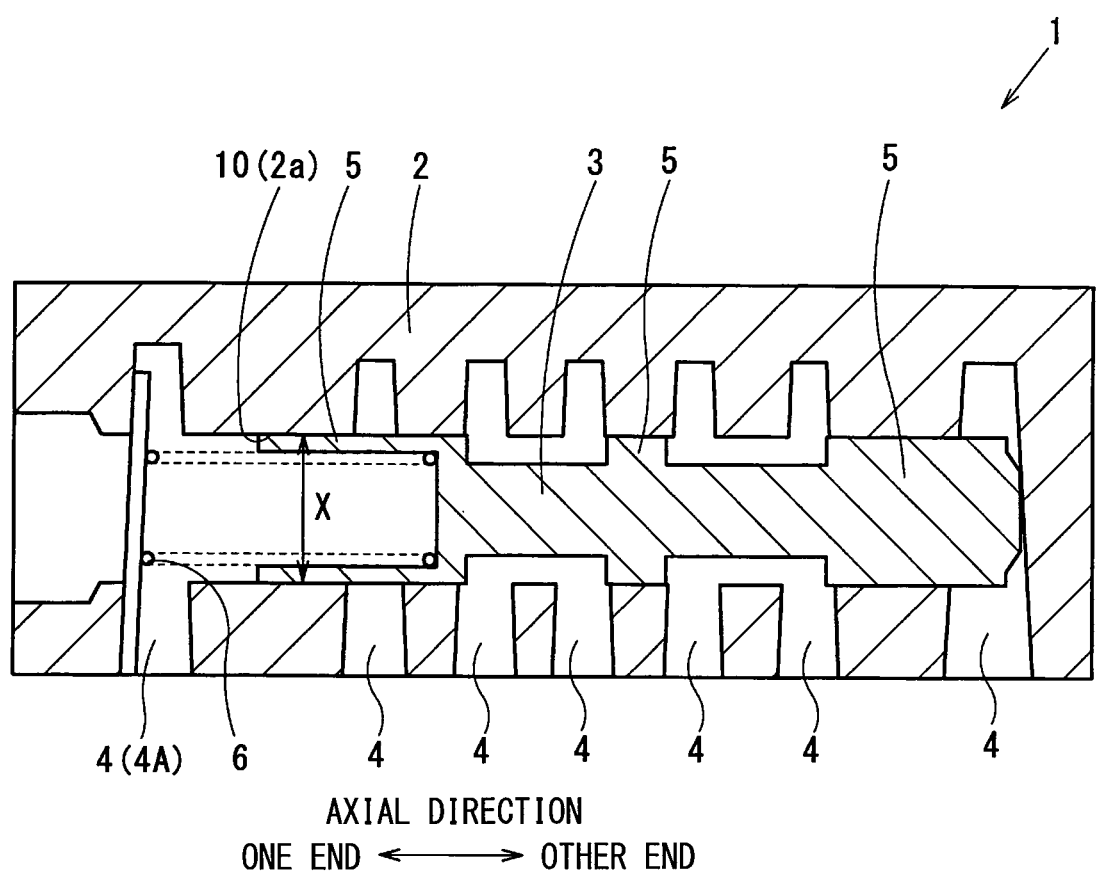
FIG. 1 is a sectional view showing a spool valve according to a first embodiment.

As shown in FIG. 1, the valve body 2 has an axial hole 2a, which extends in an axial direction. The axial direction corresponds to the horizontal direction in the drawing. The valve body 2 has a closed end on the other end side in the axial direction. The closed end of the valve body 2 is on the right side in the drawing and is on the other end side relative to the axial hole 2a. The valve body 2 has multiple ports 4 arranged along the axial direction. The ports 4 intersect substantially perpendicularly to the axial direction of the axial hole 2a. The ports 4 communicate the axial hole 2a with the outside of the valve body 2. The multiple ports 4 include an input port, an output port, an exhaust port, and/or the like. The input port receives application of a pump hydraulic pressure (input hydraulic pressure). The output port communicates with an application object of a control hydraulic pressure through a hydraulic passage. The application object is, for example, a frictional engagement device of an automatic transmission device. The exhaust port communicates with a low-pressure space, such as an interior of an oil sump.

The spool 3 includes lands 5 each to open and close an opening between the axial hole 2a and the ports 4. The spool 3 is movable in the axial direction to cause the lands 5 to switch a communication state between ports. The spool 3 is biased with a spring 6 toward the other end side in the axial direction. The spool 3 is movable in the axial direction according to a balance between a hydraulic pressure applied to the spool 3 and a biasing force of the spring 6.

The ports 4 includes a first port 4A located at the most end on the one end side in the axial direction. That is, the first port 4A is located on the leftmost side in the drawing. The axial hole 2a of the valve body 2 includes a portion (axial hole portion) on the other end side in the axial direction relative to an intersection with the first port 4A. The portion of the axial hole 2a is a spool hole 10 in which the spool 3 is slidable. The spool hole 10 has a diameter X.

(Manufacturing Method for Valve Body)

Figure 2:
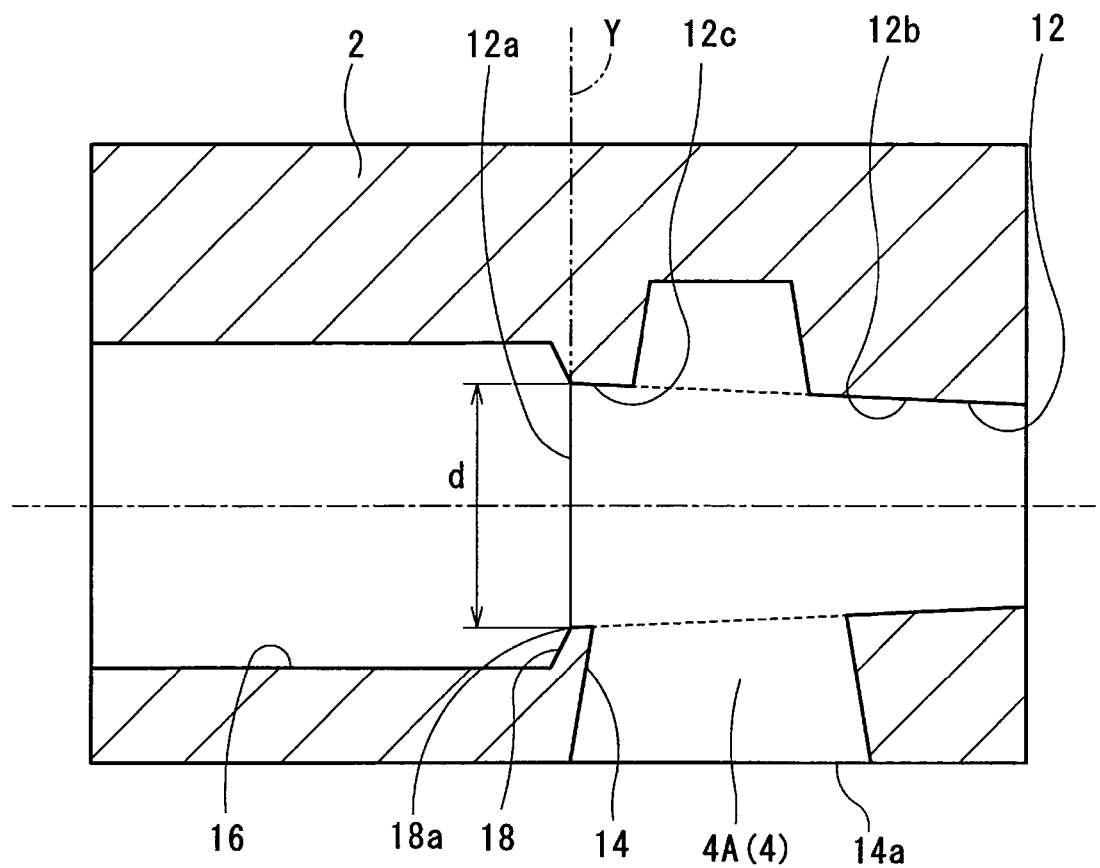
FIG. 2 is a sectional view showing a valve body of the spool valve before a finishing process, according to the first embodiment.

A manufacturing method for the valve body 2 according to the present embodiment includes a cast hole formation process, a large diameter hole formation process, and a finishing process. First, the cast hole formation process and the large diameter hole formation process will be described with reference to FIG. 2. FIG. 2 is an enlarged sectional view showing the end of the valve body on the one end side in the axial direction. In FIG. 2, illustration of valve body on the other end side in the axial direction is omitted.

The valve body 2 is formed by die-casting. The cast hole formation process is implemented in the die-casting. In the cast hole formation process, when the valve body 2 is formed by die-casting, an axial cast hole 12 is formed to extend in the axial direction. In FIG. 2, the axial cast hole 12 is formed to have a large diameter side end 12a on the one end side in the axial direction relative to the position of the first port 4A. The large diameter side end 12a is at a draft angle. The hole diameter d of the large diameter side end 12a is smaller than the predetermined diameter X. The axial cast hole 12 has a portion (axial hole portion) on the other end side in the axial direction relative to the first port 4A. The portion of the axial cast hole 12 is modified to be the spool hole 10 in a subsequent process. Therefore, the portion of the axial cast hole 12 functions as a pilot hole for the spool hole 10. Hereinafter, the portion of the axial cast hole 12, which is on the other end side in the axial direction relative to the first port 4A, is referred to as a spool-hole pilot hole 12b. The portion of the axial cast hole 12, which is on the one end side in the axial direction relative to the first port 4A, forms a cutting start portion 12c described later.

In FIG. 2, in the cast hole formation process, the multiple cast holes 14, which substantially perpendicularly intersect to the axial cast hole 12, are formed as the ports 4. It is noted that, FIG. 2 shows only the first port 4A. Each of the ports 4 is a cast hole. Therefore, each of the ports 4 is in a shape to have the large diameter side end 14a at a draft angle in the lateral surface of the valve body 2.

In the large diameter hole formation process, a large diameter hole 16 is formed on the one end side of the axial cast hole 12 in the axial direction. The large diameter hole 16 is formed to be coaxial with the axial cast hole 12. The diameter of the large diameter hole 16 is greater than the predetermined diameter X. The inner circumferential periphery of the large diameter hole 16 and the inner circumferential periphery of the axial cast hole 12 form a stepped surface 18 therebetween. The stepped surface 18 is in an annular shape. The stepped surface 18 may be equivalent to a bottom surface of the large diameter hole 16. In FIG. 2, the stepped surface 18 has an inner circumferential periphery end 18a located on a singular imaginary surface Y, which is perpendicular to the axial direction. That is, the large diameter hole 16 and the axial cast hole 12 form a boundary plane therebetween, and the boundary plane is perpendicular to the axial direction.

Figure 3:
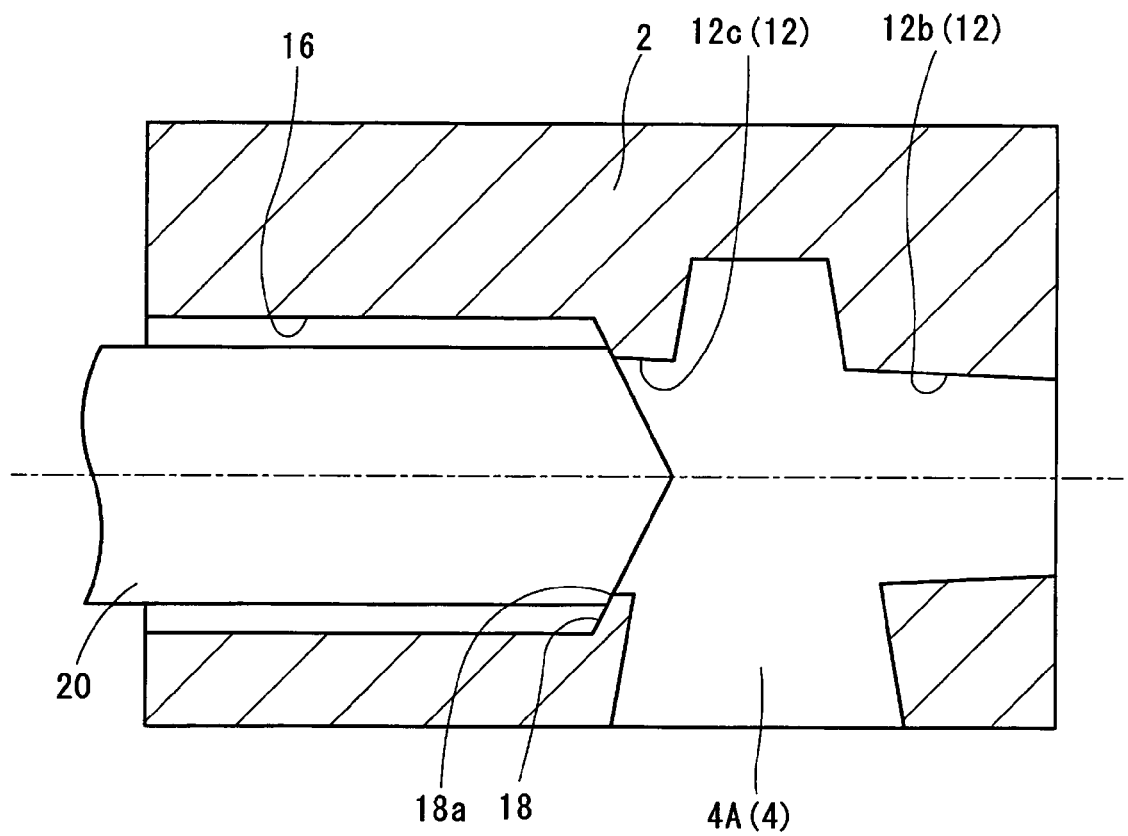
FIG. 3 is an explanatory view showing a cutting tool advanced in the finishing process, according to the first embodiment.
Figure 4:
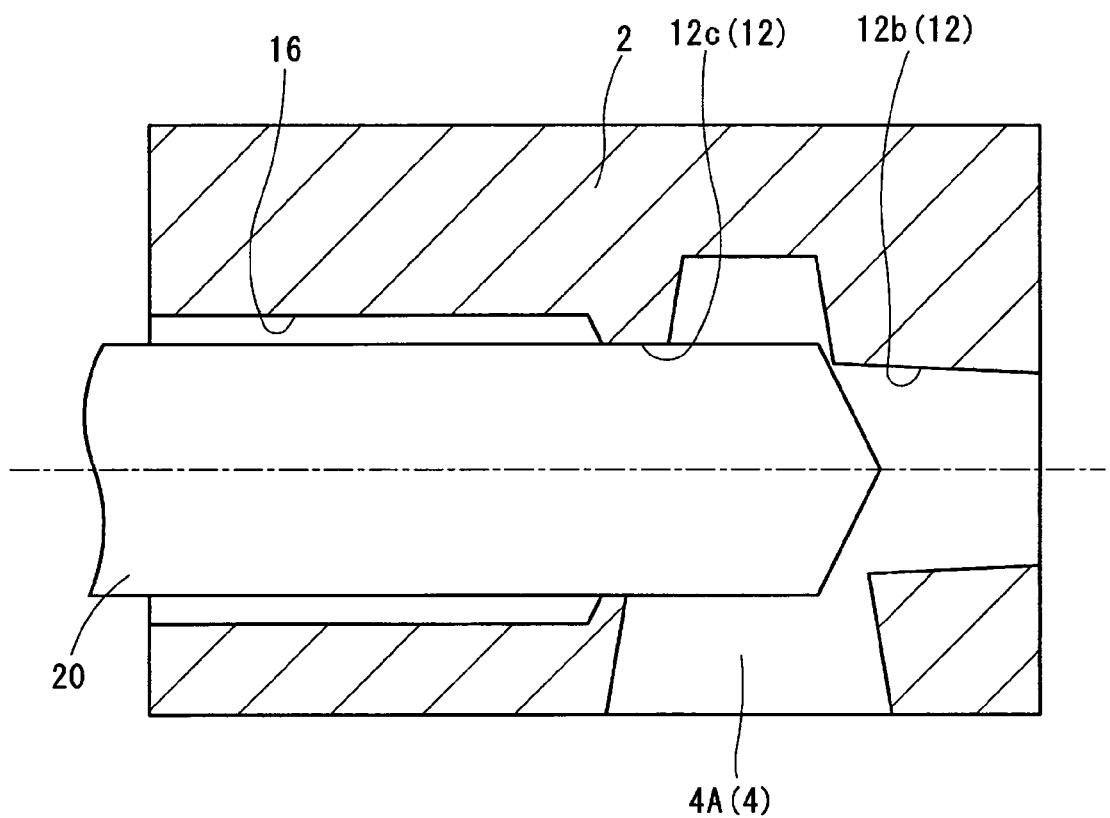
FIG. 4 is an explanatory view showing the cutting tool further advanced in the finishing process, according to the first embodiment.

Subsequently, the finishing process will be described with reference to FIG. 3 and FIG. 4. In the finishing process, a cutting tool 20, such as a drill and/or an end mill, is used to cut the inner circumferential periphery of the axial cast hole 12 to have the predetermined diameter X. As shown in FIG. 3, the cutting tool 20 is moved coaxially with the axial cast hole 12 from the opening of the large diameter hole 16, which is on the one end side in the axial direction, toward the other end side in the axial direction. In this way, the cutting tool 20 is caused to cut the inner circumferential periphery of the axial cast hole 12.

Figure 5:
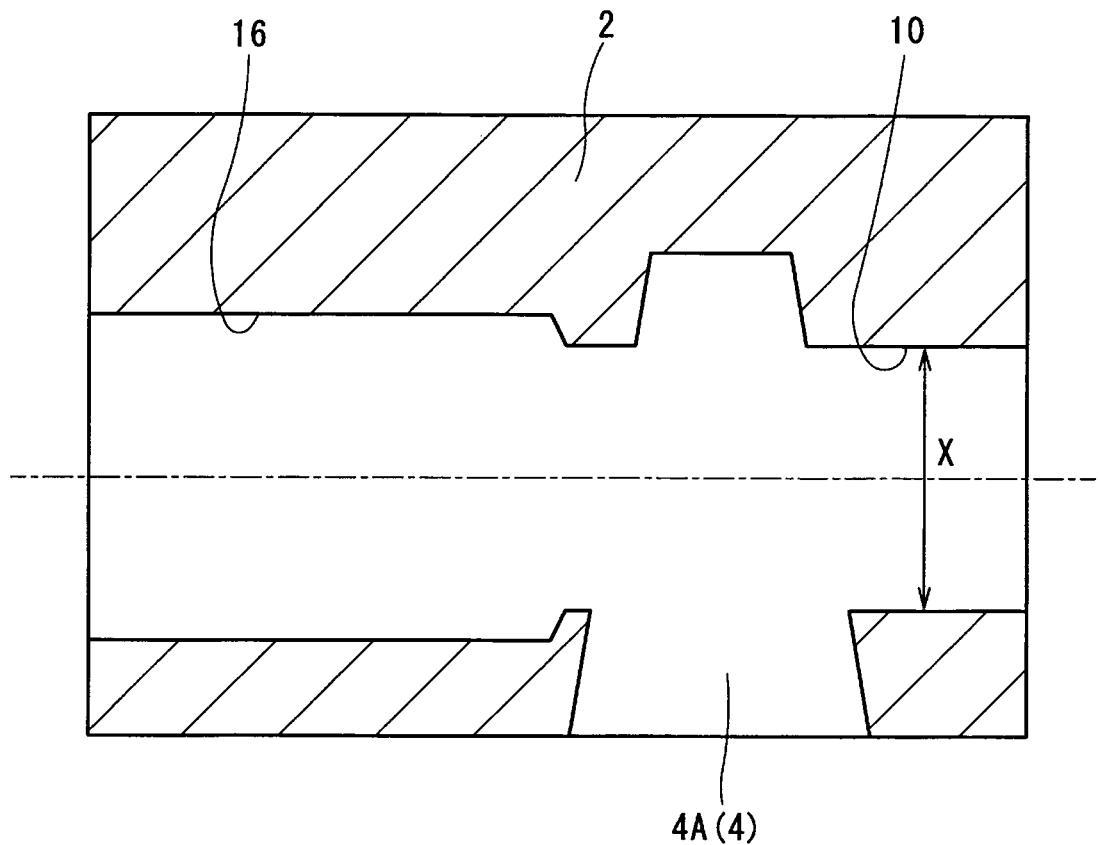
FIG. 5 is a sectional view showing the valve body after the finishing process, according to the first embodiment.

In FIG. 3, the cutting tool 20 moves first to make contact with the stepped surface 18. Subsequently, as shown in FIG. 4, the cutting tool 20 cuts the inner circumferential periphery of the cutting start portion 12c of the axial cast hole 12 between the large diameter hole 16 and the first port 4A. Subsequently, as shown in FIG. 5, the cutting tool 20 cuts the inner circumferential periphery of the spool-hole pilot hole 12b thereby to form the spool hole 10 to have the predetermined diameter X. Referring to FIG. 4, the first port 4A is at the draft angle. Therefore, when the cutting tool 20 begins to cut the inner circumferential periphery of the spool-hole pilot hole 12b, the cutting tool 20 makes contact partially with the inner circumferential periphery of the first port 4A on the side of a small diameter portion of the first port 4A. It is noted that, in the present state, the cutting tool 20 moves while being guided by the cutting start portion 12c. Therefore, the cutting start portion 12c restricts deflection of the cutting tool 20.

Figure 6:
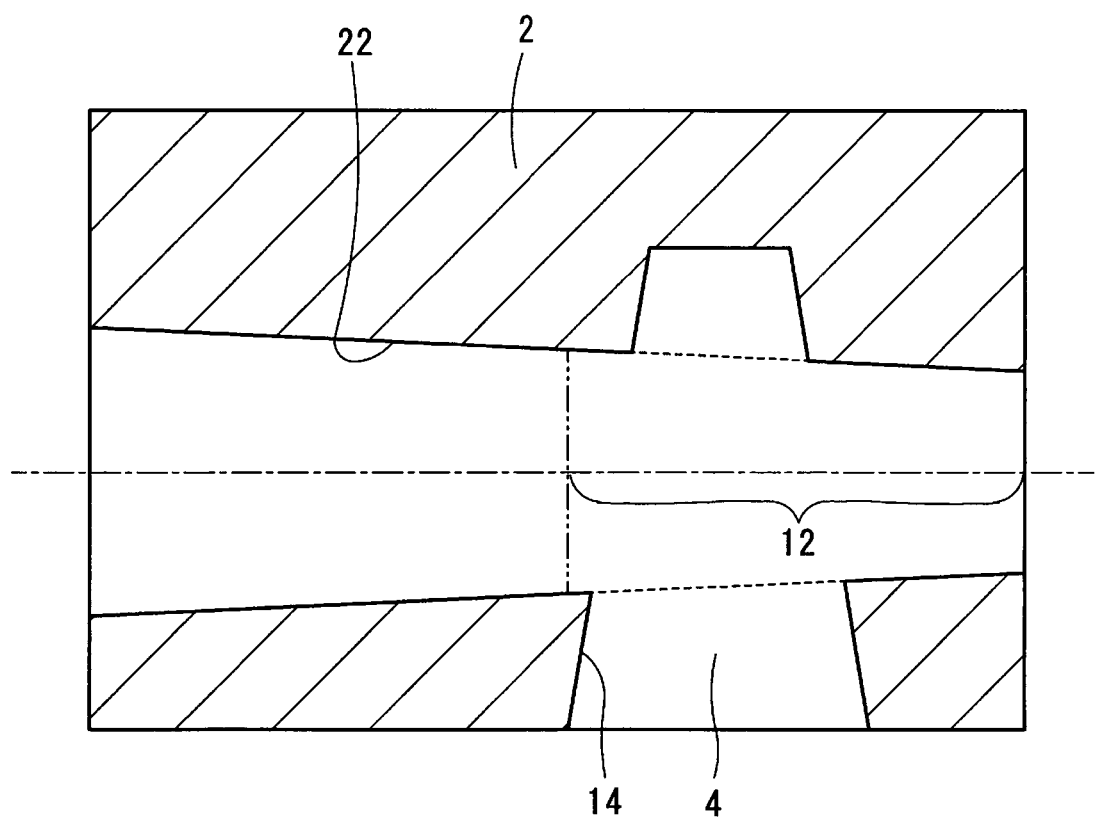
FIG. 6 is a sectional view showing the valve body formed with an axial cast hole and a large diameter pilot hole in a cast hole formation process, according to the first embodiment.

As follows, details of the cast hole formation process and the large diameter hole formation process will be described with reference to FIG. 6 and FIG. 7. In FIG. 6, in the cast hole formation process, a casting core, which is at a predetermined draft angle, is used to form cast hole 22 in the valve body 2. Furthermore, the cast hole 14 is formed to intersect perpendicularly to the cast hole 22. The cast hole 14 forms each port 4.

The cast hole 22 is at the draft angle to have a large diameter end on the one end side in the axial direction. A part of the cast hole 22 forms the axial cast hole 12. The portion of the cast hole 22 on the one end side in the axial direction relative to the axial cast hole 12 forms the pilot hole for the large diameter hole 16.

Figure 7:
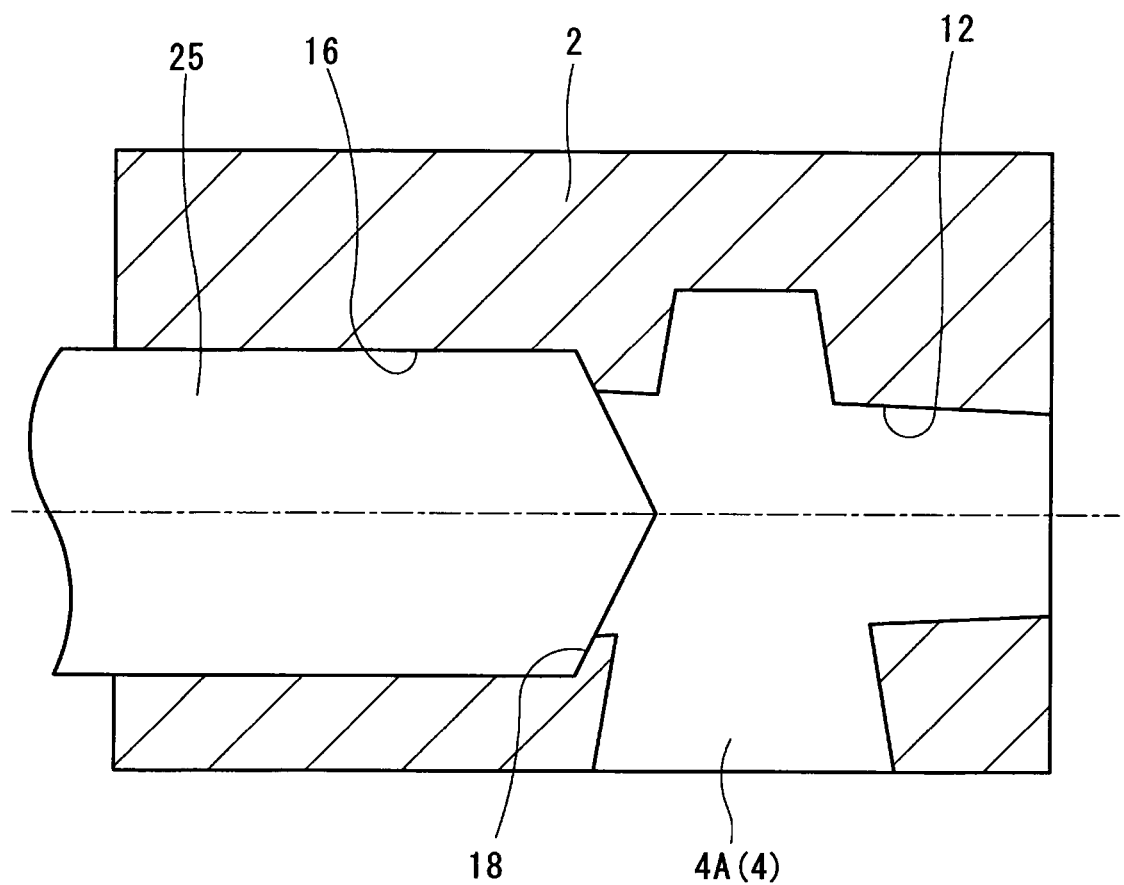
FIG. 7 is an explanatory view showing formation of a large diameter hole by cutting according to the first embodiment.

Referring to FIG. 7, in the large diameter hole formation process, the large diameter hole 16 is formed via the stepped surface 18. Therefore, a cutting tool 25, which has the diameter greater than the predetermined diameter X, is caused to cut the inner circumferential periphery of the one end of the cast hole 22 in the axial direction. The cast hole 22 forms the pilot hole for the large diameter hole 16. In this way, the large diameter hole 16, which has the diameter greater than the predetermined diameter X, and the stepped surface 18 are formed to be in a state as shown in FIG. 2 prior to the finishing process. That is, according to the present embodiment, the large diameter hole 16 is formed by cutting (machining work).

Effect of Embodiment

According to the present embodiment, in the cast hole formation process, the axial cast hole 12 is formed in include the cutting start portion 12c and the spool-hole pilot hole 12b. The diameter of the axial cast hole 12 is smaller than the predetermined diameter X. Furthermore, in the large diameter hole formation process, the large diameter hole 16 is formed on the one end side of the cutting start portion 12c in the axial direction. The diameter of the large diameter hole 16 is greater than the predetermined diameter X.

According to the present method, when the cutting tool 20 is moved (advanced) in the finishing process, the cutting tool 20 cuts the inner circumferential periphery of the cutting start portion 12c between the large diameter hole 16 and the first port 4A. In FIG. 4, the cutting tool 20 is further moved, while being guided by the cut portion, to cut the other end side of the first port 4A in the axial direction. Therefore, the cutting tool 20 is advanced to the other end side in the axial direction while being guided by the one end side of the first port in the axial direction. Therefore, deflection of the cutting tool 20 is restrained. As a result, a manufacturing accuracy of the spool hole 10 is enhanced.

It is noted that, when the cutting tool 20 begins to cut the cutting start portion 12c, the cutting tool 20 first makes contact with the stepped surface 18. It is further noted that, the inner circumferential periphery end 18a of the stepped surface 18 is on the plane perpendicular to the axial direction. Therefore, the cutting tool 20 may not cause partial contact with the stepped surface 18.

Second Embodiment

Figure 8:
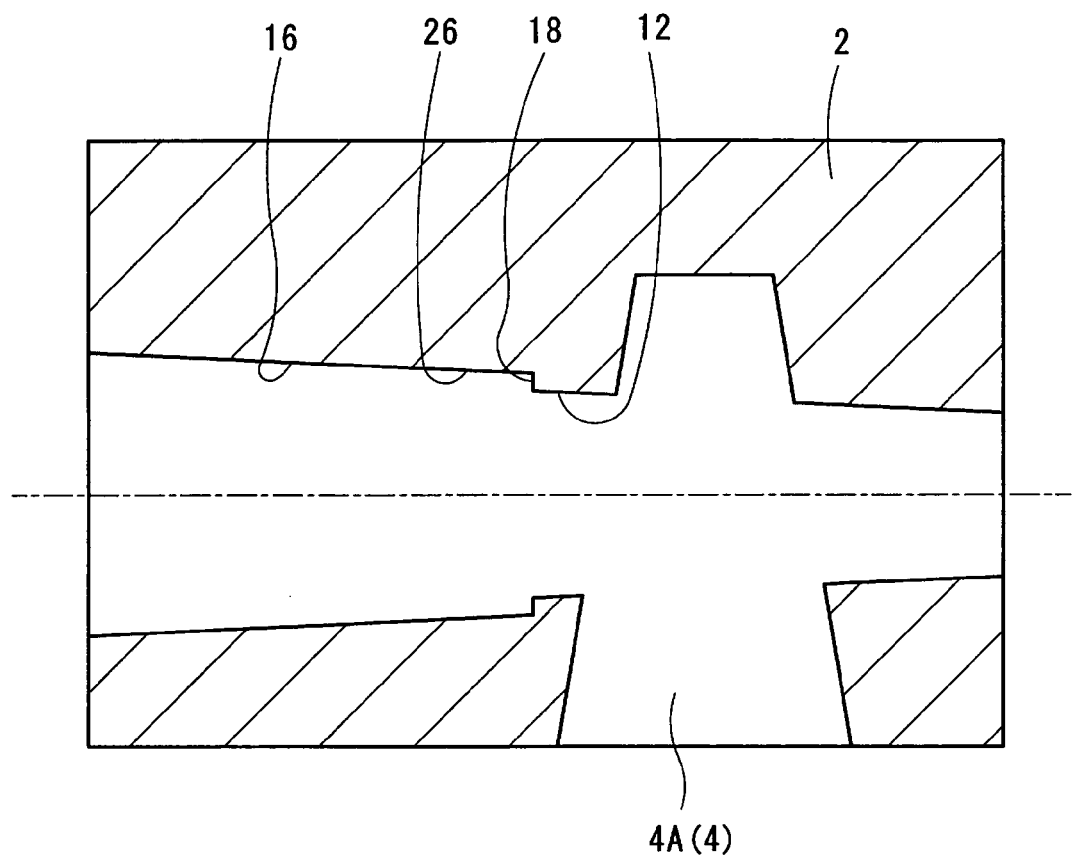
FIG. 8 is a sectional view showing a valve body formed with a large diameter hole by removing a casting core, according to a second embodiment.
Figure 9:
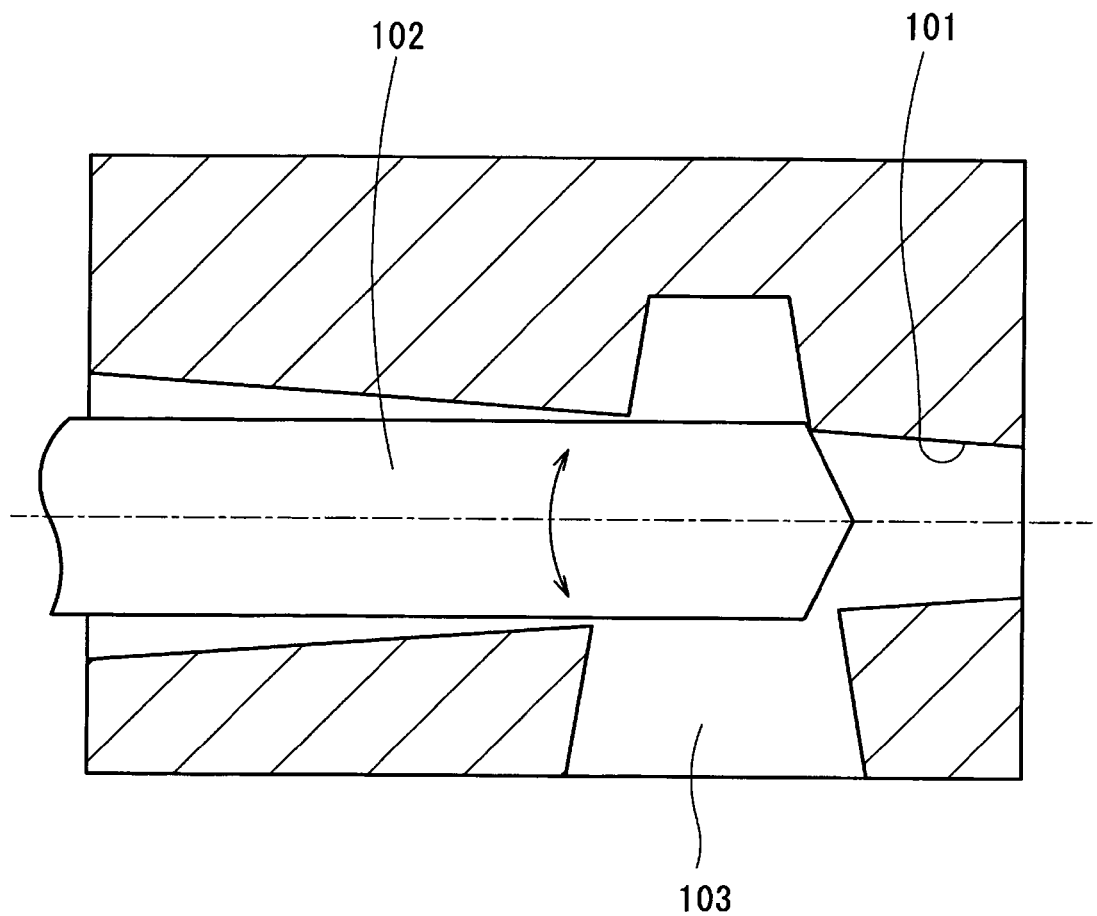
FIG. 9 is an explanatory view showing a manufacturing method of a conventional valve body according to a prior art.

As follows, the second embodiment will be described with reference to FIG. 8. In the subsequent description, difference from the first embodiment will be described. In the manufacturing method for the valve body according to the present embodiment, the large diameter hole 16 is formed by removing a casting core. That is, the cast hole formation process and the large diameter hole formation process are implemented simultaneously. Specifically, a cast hole 26 is formed by using a casting core, which is in a stepped shape. When the casting core is removed, the stepped surface 18 is formed. In addition, the large diameter hole 16 is formed on the one end side of the stepped surface 18 in the axial direction. In addition, the axial cast hole 12 is formed on the other end side of the stepped surface 18 in the axial direction. Thus, the finishing process is implemented.

The present embodiment may produce an operation effect similarly to the first embodiment.

The manufacturing method for the valve body according to the present disclosure is applied to the spool valve. The spool valve includes the valve body and the spool.

The valve body has the axial hole and multiple ports. The ports substantially perpendicularly intersect with the axial direction. The ports communicate the axial hole with the outside of the valve body. The ports are arranged along the axial direction.

The spool is slidable inside the axial hole in the axial direction. The ports include the first port on the most one end side in the axial direction. The axial hole of the valve body has the portion (axial hole portion) on the other end side in the axial direction relative to the first port. The axial hole portion is formed as the spool hole having the predetermined diameter. The spool is slidable in the spool hole.

The manufacturing method for the valve body for the spool valve according to the present embodiment includes the cast hole formation process, the large diameter hole formation process, and the finishing process. The cast hole formation process includes forming the axial cast hole on the one end side in the axial direction relative to the first port. The axial cast hole has the large diameter side end at the draft angle. The large diameter side end has the diameter greater than the predetermined diameter. The cast hole formation process further includes forming the multiple cast holes, which substantially perpendicularly intersect with the axial cast hole, as the ports.

The large diameter hole formation process includes forming the large diameter hole on the one end side of axial cast hole in the axial direction. The large diameter hole is coaxial with the axial cast hole. The large diameter hole has the diameter greater than the predetermined diameter. The stepped surface, which is in the annular shape, is formed between the large diameter hole and the axial cast hole.

The finishing process includes moving of the cutting tool coaxially with the axial cast hole from the one end of the large diameter hole in the axial direction to the other end side in the axial direction to cut the inner circumferential periphery of the axial cast hole to form the spool hole having the predetermined diameter.

The stepped surface, which is in the annular shape and is formed in the large diameter hole formation, has the inner circumferential periphery end. The inner circumferential periphery end is on the plane, which is perpendicular to the axial direction.

The finishing process further includes moving of the cutting tool to make contact with the stepped surface, and subsequently, to cut the inner circumferential periphery of the axial cast hole between the large diameter hole and the first port, and subsequently, to cut the inner circumferential periphery of the axial cast hole on the other end side of the first port in the axial direction.

According to the present disclosure, when the cutting tool is moved in the finishing process, the cutting tool is caused to cut the inner circumferential periphery of the portion of the axial cast hole between the large diameter hole and the first port, and the cutting tool is moved further while being guided by the portion. Thus, the cutting tool cuts the other end side of the first port in the axial direction. Therefore, the cutting tool is moved toward the other end side in the axial direction while being guided on the one end side of the first port in the axial direction. Therefore, deflection of the cutting tool may be restrained. As a result, a manufacturing accuracy of the spool hole is enhanced. It is noted that, when the cutting tool starts to cut, the cutting tool may first make contact with the stepped surface. It is further noted that, the inner circumferential periphery end of the stepped surface is on the plane perpendicular to the axial direction. Therefore, the cutting tool may be restricted from conducting partial cutting.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A method for manufacturing a valve body for a spool valve, the spool valve including:
   the valve body having an axial hole and a plurality of ports, the plurality of ports substantially perpendicularly intersecting with the axial hole and communicating the axial hole with an outside of the valve body, the plurality of ports arranged in an axial direction; and
   a spool slidable inside the axial hole in the axial direction, wherein
   the plurality of ports include a first port on one end side in the axial direction, and
   the axial hole has an axial hole portion on an other end side in the axial direction relative to the first port, the axial hole portion formed as a spool hole, in which the spool is slidable, the spool hole having a predetermined diameter (X),
   the method comprising:
   forming, in a cast hole formation process,
      an axial cast hole to have a large diameter side end on the one end side in the axial direction relative to the first port, the large diameter side end being at a draft angle and having a diameter smaller than the predetermined diameter (X), and
      a plurality of cast holes as the plurality of ports to intersect substantially perpendicularly to the axial cast hole;
   forming, in a large diameter hole formation process, a large diameter hole on the one end side in the axial direction relative to the axial cast hole to form a stepped surface, which is in an annular shape, between the large diameter hole and the first port, the large diameter hole being coaxial with the axial cast hole and having a diameter greater than the predetermined diameter (X); and
   moving, in a finishing process, a cutting tool from the one end side in the axial direction relative to the large diameter hole toward the other end side in the axial direction coaxially with the axial cast hole to cut an inner circumferential periphery of the axial cast hole to form the spool hole having the predetermined diameter (X), wherein
   the stepped surface has an inner circumferential periphery end located on a plane perpendicular to the axial direction, and
   the finishing process further includes moving the cutting tool to make contact with the inner circumferential periphery end of the stepped surface, and subsequently to cut the inner circumferential periphery of the axial cast hole between the large diameter hole and the first port to form the inner circumferential periphery end having the predetermined diameter (X), and subsequently, while the cutting tool being in contact and guided by the inner circumferential periphery end having the predetermined diameter (X), to cut the inner circumferential periphery of the axial cast hole on the other end side in the axial direction relative to the first port to form the spool hole having the predetermined diameter (X).

2. The method according to claim 1, further comprising: forming the large diameter hole by cutting.

3. The method according to claim 1, further comprising: forming the large diameter hole by removing a casting core.

4. The method according to claim 1, wherein the spool valve is for a hydraulic pressure control device for an automatic transmission device.

5. The method according to claim 1, wherein
   the finishing process further includes moving the cutting tool to cause a fore end of the cutting tool to be in surface-contact with the inner circumferential periphery end of the stepped surface when the cutting tool makes contact with the stepped surface.

6. The method according to claim 1, wherein the first port is on an extreme side of an one axial end on the one end side of the valve body.

* * * * *